United States Patent [19]
Hutchison

[11] 3,753,843
[45] Aug. 21, 1973

[54] MOLDED STRUCTURAL PANEL
[75] Inventor: David John Hutchison, Toronto, Ontario, Canada
[73] Assignee: Monostruct Corporation Limited, Toronto, Ontario, Canada
[22] Filed: June 29, 1970
[21] Appl. No.: 50,787

[52] U.S. Cl............ 161/43, 52/615, 161/68, 161/159, 161/190
[51] Int. Cl............................................. B32b 3/12
[58] Field of Search.............. 29/455 LM; 52/615; 156/197; 161/68, 69, 43, 44; 264/45

[56] References Cited
UNITED STATES PATENTS

| | | | |
|---|---|---|---|
| 2,061,569 | 11/1936 | Fischer | 161/68 X |
| 2,744,042 | 5/1956 | Pace | 161/68 X |
| 3,246,058 | 4/1966 | Voelker | 161/69 X |
| 3,249,659 | 5/1966 | Voelker | 264/47 |
| 3,543,315 | 12/1970 | Hoffman | 161/68 X |
| 3,582,447 | 6/1971 | Stolki | 161/68 |
| 3,407,110 | 10/1968 | Axelson et al. | 161/68 |
| 3,257,260 | 6/1966 | Morgan | 161/69 |
| 3,298,433 | 1/1967 | Lemelson | 165/168 |

FOREIGN PATENTS OR APPLICATIONS 810,809  3/1959  Great Britain ............. 161/68

Primary Examiner—George F. Lesmes
Assistant Examiner—Henry F. Epstein
Attorney—Douglas S. Johnson

[57] ABSTRACT

A panel comprises an essentially multi-cellular core and a seamless covering over major surfaces of the core and over at least a portion of the periphery thereof. The panel is produced in a mold by spacing the core away from the mold faces and molding the covering material around the core.

4 Claims, 5 Drawing Figures

PATENTED AUG 21 1973

INVENTOR.
DAVID J. HUTCHISON

BY Douglas J. Johnson

Attorney

PATENTED AUG 21 1973

*INVENTOR.*
DAVID J. HUTCHISON

BY *Douglas S. Johnson*

Attorney

3,753,843

MOLDED STRUCTURAL PANEL

BACKGROUND OF THE INVENTION

This invention relates to a cored panel and a method of producing the same. More especially, the invention relates to a panel having a core and a substantially seamless covering over the cores, and to a method of producing the panel using molds.

The invention contemplates the production of substantially seamlessly covered, cored panels where the core is one which provides voids within the structure of the finished panel so as to substantially reduce the effective or net density of the panel. The covering material contemplated is a flowable and hardenable material so that the panel may be produced in molds, and so that the panel may be unmolded after the covering material has hardened sufficiently to allow the same.

Many molded structure panels have been provided in the prior art, including those taught in U.S. Pat. Nos. 2,744,042, 2,793,792, 2,911,274, 3,141,206, 3,233,056, 3,255,062, 3,233,797, 3,346,442 and 3,470,058. All of these patents teach cored panels of one form or sense, or another, and each of the panels is produced in a manner which includes laminating or building up of the panels so that seams and interfaces are formed between each of the laminae of the finished panel, including those of the covering of the panel; which coverings do not therefore extend seamlessly across at least a portion of the periphery of the core. Many of the panels include cores which provide voids when the laminated panel is completed, such cores usually comprising honeycomb spacers of one form or another; and several of the prior art panels contemplate the use of foamable plastic material and thermosetting plastic materials. Certain of the panels of the prior art are molded in the sense that a so-called mold may be coated on its inside with a gel-coat which may then be reinforced by such as glass fibre fabric, and the panel is laid up behind the hardenable outer skin laminate.

As noted, this invention contemplates a core panel wherein the core provides voids within the finished panel, and the core may be of a honeycomb structure; but this invention also contemplates a molded panel where the covering over said core covers the major faces thereof and at least a portion of theouter periphery of the core between its major faces, the covering being substantially seamless. The process for producing the panel according to this invention contemplates a molding operation whereby the core intended for incorporation into the panel is placed in a mold and a flowable and hardenable material is flowed into the mold and over the major faces of the core and over at least a portion of the outer periphery of the core between the major faces. Where the core is of a generally honeycomb structure so that a plurality of cells is formed therein, certain of the cells may be substantially filled with the same material as the panel covering — the cell filling operation having gone on at the same time as the covering was placed in the mold — for purposes and in a manner as discussed hereafter.

The molded, substantially seamlessly covered, cored panel contemplated by this invention may be incorporated into many structures where panels would normally be used, such as movable partitions, furniture items, curtain walls and spandrels, doors, and caskets. The panel members need not be planar on their major surfaces, nor regular in cross section; and they may indeed be curved in cross section and/or irregular in cross section, as discussed hereafter.

The covering material generally contemplated for the substantially seamlessly covered, cored panel members of this invention includes expandable polystyrene beads, foamable polyurethane and foamable polystyrene; along with foamable polybutadiene, and even concrete and foamable concrete.

The compressive, bending and shear strengths of solid panels are directly proportional to the cross sectional thickness of the panel. Thus, as the thickness of a solid panel increases, so do its strength properties with respect to the compression, bending and shear. However, many disadvantages are to be found in solid panels, including among them the increase in cost as thickness increases, their tendency to warp, and their high net density.

Cored panels where the core is such as to incorporate voids into the finished panel provide panels having low net density; and may provide panels having identical compression, bending and shear strengths together with much lower density as compared with solid panels of the same cross sectional thickness. Also, especially where the core is comprised of a honeycomb material — which usually is made of kraft or other heavy paper so that it has substantially parallel major faces and a plurality of walls extended between them forming a plurality of cells between the major faces and bounded by said walls — the compression, bending and shear strengths of the panel may be increased or decreased without changing the cross-sectional thickness of the panel merely by selection of an appropriate honeycomb strucure. Where a substantially seamless covering is molded around the honeycomb core so as to cover the major faces of the core and at least a portion of the periphery of the core between the major faces, the only interfaces which are formed are between the core material and the covering material, and no inherently weak seams or interfaces between laminae are formed as in the prior art panels. Further, the covering material can be "interlocked" to the honeycomb core material of a panel contemplated by this invention, in a manner discussed hereafter.

Especially where plastic covering materials, such as foamable polyurethane, are used in a panel as contemplated by this invention, a hard skin can be formed on the panel member using known techniques such as overcharging the mold, heating the mold faces, or pre-coating the mold; and nearly any desired surface and colour thereof can be produced. Thus, using known electro-forming techniques, a mold face which reproduces a wood grain can be provided, and a panel member can be produced having a wood colour which, when subsequently wiped using other known techniques, faithfully reproduces the wood grain effect on the surface of the panel.

SUMMARY OF THE INVENTION

The present invention provides a molded panel member whose compression, bending and shear strengths can be chosen, within limits, irrespective of the cross-sectional thickness of the panel, and where the panel has low net density compared with solid panels of the same exterior dimensions.

A further object of this invention is to provide a substantially seamlessly covered, cored panel, which can be easily and inexpensively produced.

A still further object of this invention is to provide a method of producing a substantially seamlessly cored panel member using flowable and hardenable covering materials, and molds.

BRIEF DESCRIPTION OF THE DRAWINGS

These and other features and objects of the invention will become more clear in the following description taken in association with the drawings in which.

DESCRIPTION OF THE PREFERRED EMBODIMENTS

Figure 1:
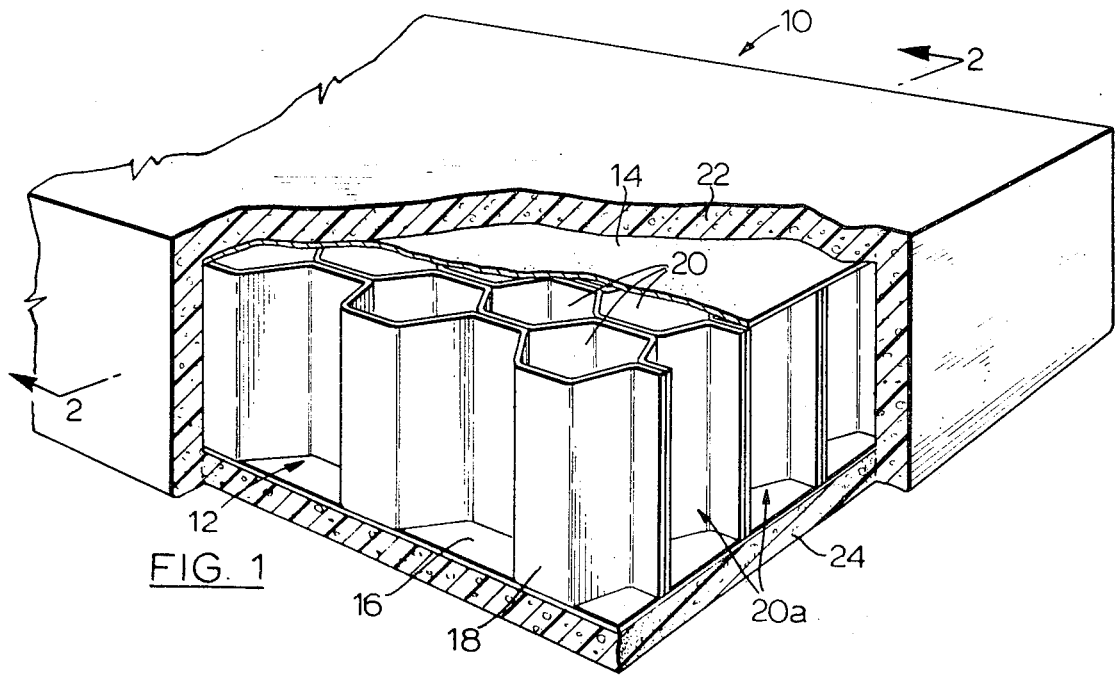
FIG. 1 is a perspective, partially cut-away view of a panel member according to this invention.
Figure 2:
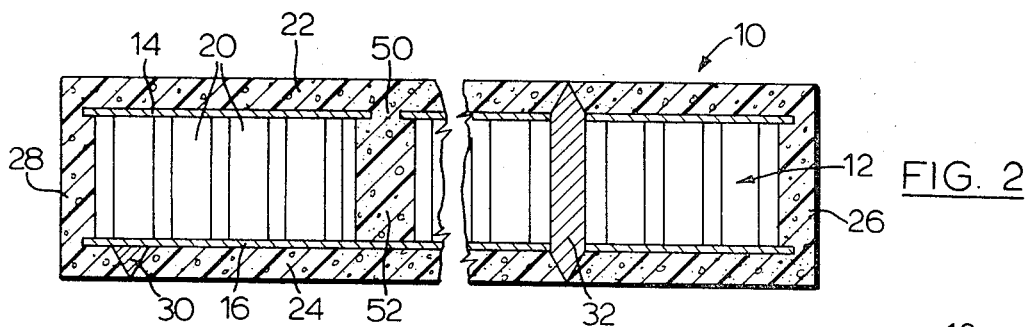
FIG. 2 is a cross section of the panel member of FIG. 1 taken in the direction of arrows 2—2 of FIG. 1.

A panel 10 is shown in FIGS. 1 and 2. The dimensions of the panel are irrelevant, and would depend to a large extent upon the purposes for which the panel is intended. The following discussion is therefore directed to the molded, substantially seamlessly covered, cored panel member according to this invention, and the method of making the same; and includes variations of integers and materials as discussed hereafter.

In general, a panel according to this invention includes a core which may conveniently be of a honeycomb nature. The core 12, as illustrated in FIGS. 1 to 4, is a commercially available honeycomb structure made from material such as kraft paper; and includes upper and lower coverings 14 and 16 forming upper and lower major faces respectively, and a plurality of wall structures 18 between them forming a plurality of cells 20. Obviously, the cells 20 extend between the upper and lower faces 14 and 16 and are bounded by the walls 18. As mentioned, honeycomb material of this type is commercially available, and its precise construction and configuration form no part of this invention. It is important to note, however, that honeycomb of varying thicknesses and with various compressive and bending strengths is available; so that, for the same thickness, one piece of honeycomb may have considerably different compressive strength than another.

It is an important feature of this invention that the covering over the core of the panel is substantially seamless over each of the first and second major faces of the core and over at least a portion of the outer periphery of the core between said major faces. Thus, having regard especially to FIGS. 1 and 2, it is seen that a covering 22 is over the upper major face 14 of the core 12, covering 24 is over the lower major face 16 of the core 12, and at least a portion of the outer periphery of core 12 such as is indicated at 26 and 28 in FIG. 2 is also covered by the same covering material as constitutes the upper and lower covering 22 and 24. Also, there is no seam or interface between any of the portions of the covering comprising 22, 26 or 28, and 24, so that the covering is essentially homogeneous or monolithic as discussed hereafter.

In order to produce a panel according to this invention, it is necessary to use a mold in which the substantially seamless covering over the core can be formed, using flowable and hardenable covering material. Thus, it may be possible to place flowable and hardenable material in the bottom of a simple, five-sided mold with an open top, and to place the core over said material in such a manner that the core does not extend into the previously placed material so as to displace it sufficiently that it no longer covers the one major face of the core, and then to continue pouring or placing the flowable and hardenable covering material around at least a portion of the periphery of the core and over the other major face thereof. To use such production technique would depend, of course, on the nature of the flowable and hardenable covering material; because the material would have to be such as to permit placing of the core after a portion of the material had itself been placed on the mold, as noted above; but the covering material must not be hardenable so quickly as to preclude further placement of it, so that all of the covering material hardens or cures together without any seam or interface being formed between any portion of it and other portions thereof.

It has been found more expeditious, especially when the material of the covering for the core is a plastic material, to place the core first into the mold and to secure it using spacing means as discussed hereafter so that no portion of a major face of the core material is in contact with a portion of the co-adjacent major face of the mold, wherever there be such a major face.

In order to accommodate the placing of the core 12 in a mold so that neither of its major faces touches a major face of the mold, core spacing means may be first placed in the mold so as to space the core faces away from faces of the mold. Thus, core spacing means may be conical or wedge shaped as indicated at 30 in FIG. 2. Another core spacer having sharpened rod-like appearance is shown at 32. It has been remarked that the core material of core 12 is most often of a honeycomb structure which is readily, commercially available, and which usually is made of kraft paper or the like. The upper and lower paper sheet coverings which comprises the upper and lower surfaces 14 and 16 can be pierced by a spacing means such as 32, and the spacer 32 is sufficiently securely held by the paper so as to space one or both of the major faces away from the mold faces as required.

The material of the core spacers 30 and 32 may be any sufficiently rigid material, especially where the spacers are pointed, or substantially pointed, so that very little evidence of the spacer is seen at the outer surface of the molded panel. Also, the spacer material may be of such materials as will chemically co-act with the flowable and hardenable covering material, such as those for which the covering material is a solvent, so that as the covering material is placed around the spacer and begins to harden or cure, the spacer forms a solid molecular interface with the material or enters into solution or dispersion in the covering material.

Figure 5:
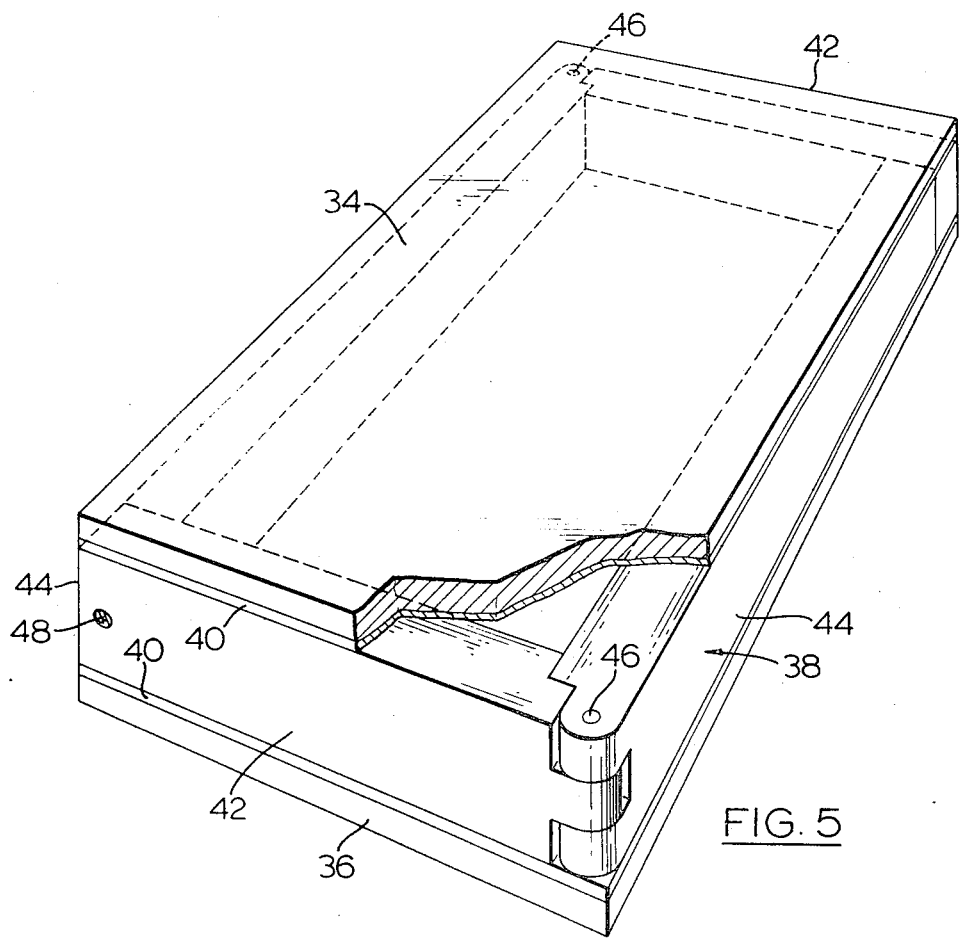

A typical mold is illustrated in FIG. 5, and comprises upper and lower mold covers 34 and 36 respectively, together with a mold frame indicated generally at 38. The mold frame 38 may have an interface between its upper and lower surfaces respectively and the inside surfaces of the mold covers 34 and 36, which interface may be of copper strips such as indicated at 40. When the mold is particularly intended for use with foamable polyurethane, it is adapted to be securely clamped or bolted closed so as to withstand the pressures and temperatures which may be generated within it during the foaming reaction of the polyurethane. Additionally, means may be provided to vent the mold of gases which are generated therein or displaced therefrom, and further means may be provided either to cool or heat the mold faces, as required. All of these are matters of molding technique which are not within the ambit of this invention.

The particular mold which is illustrated in FIG. 5 is one which contemplates a cored panel which is covered with the flowable and hardenable covering material on all six faces, and in which the peripheral faces are essentially straight and without draft from top to bottom. In order to easily accommodate the unmolding of such a panel without draft in its sides, the mold frame 38 comprises two ends 42 and two sides 44 so that one end and one side respectively are hinged at hinge pins 46. Suitable bolting or clamping means may be provided at the end and side pieces opposite their hinged ends, as at 48. A metal-to-metal seal may be effected at each of the interior corners of the mold as it is secured together.

Either or both of the major mold faces, or even the peripheral faces, may have a pattern formed therein. This may be readily accomplished by such as electro-depositing copper over a chosen wood panel where a wood grain effect is to be reproduced in the molded panel, or by etching a pattern into the mold face, or by placing a suitable butadiene or silicon rubber mold part against the mold face, or otherwise.

It will be noted that a certain interlocking effect is achieved between the partial cells at the outer periphery of the core (e.g., as at 20a in FIG. 1) and the covering material which may extend past them from top to bottom of the panel. The interlocking may be as is shown in cross section at 26 and 28 in FIG. 2. Also, it may be desired in some circumstances to puncture one or the other paper sheet coverings of the core as at 50 so as to flood the cell therebeneath with covering material as at 52 in FIG. 2. Especially where the material of the covering is machinable after it is completely hardened or cured, such as foamed polyurethane, certain of the cells of the core may be flooded at the same time that the covering material is placed in the mold so as to accommodate subsequent placing of fastening means in those chosen locations.

Figure 3:
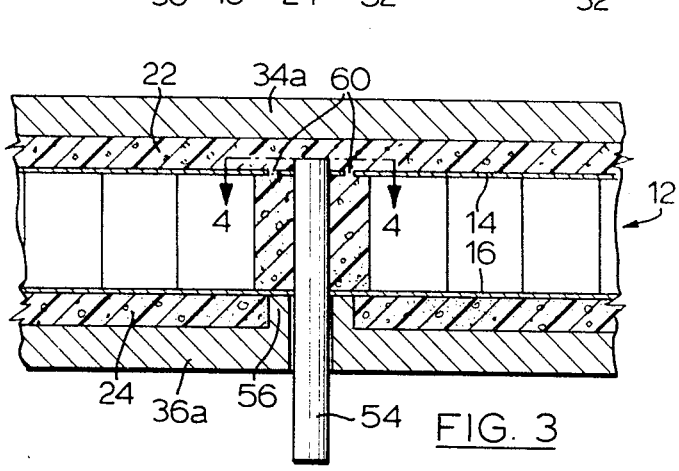
FIG. 3 is a partial cross section of another embodiment of the invention, also showing mold pieces.
Figure 4:
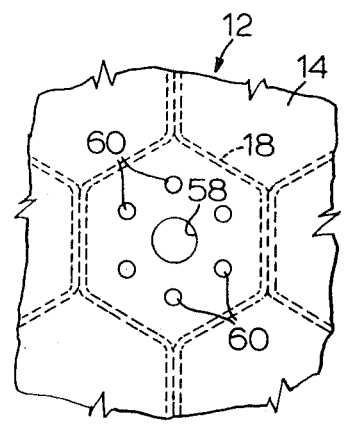
FIG. 4 is a view, in plan, looking in the direction of arrows 4—4 of FIG. 3; and, FIG. 5 is a perspective, partially cut-away and partially diagramatic view of a mold for making the panel members contemplated by this invention.

Another manner by which fastening means may be securely placed within the molded panel is illustrated in FIGS. 3 and 4. There is shown top and lower mold covers 34a and 36a respectively, with upper and lower panel coverings 22 and 24 over the core 12 as discussed above. A pin 54 extends through the lower mold cover 36a, which is also upset at 56 to accommodate the pin 54. The pin may extend completely through the core 12 and partially into the volume to be occupied by the upper panel covering 22. A hole 58 in the upper paper covering of core 12 therefore accommodates the upper end of the pin 54, and the hole 58 may be surrounded by a plurality of holes or vents 60. When the flowable and hardenable covering material is placed in the mold to form the upper covering 22, some of it will flow through the holes 60 into the cell through which the pin 54 extends, thereby flooding that cell in like manner to that discussed above with respect to cell 52. However, in this case, when the time to unmold the panel, the pin 54 may be used as a knock-off pin, so that especially after removal of the top mold cover 34a — when it is used — the molded panel may be lifted clear from the lower mold cover 36a and the upset rim 56 formed therein by advancing the pin 54 and then subsequently withdrawing the same from the molded panel. The recess which is formed in the surface of the panel by the upset rim 56 and the pin 54 is such as to accommodate a plug or other fastening means, as may be contemplated by the design of the panel in the first instance. It is also evident that other arrangements may be made to flood interior portions of the panel at desirable places therein so as to accommodate such items as hinges and door bolts, electric and communications conduit, hardware fastening means, etc. Thus, a panel may easily be molded having a wood grain effect at its surface and which may subsequently be used as a panel of a furniture piece or a casket. Likewise other panels may be molded having edges designed to accommodate extruded vinyl tape for use in movable partitions. Still other panels may be molded for use as panels in other furniture items, doors, curtain walls, etc.

It becomes evident that the cross section of a molded panel according to this invention need not be uniform, nor that the major faces of the panel and its core be planar. Curved cross sections may be as easily molded as planar ones, using the proper molds, and employing core spacing means as discussed above.

The material of the flowable and hardenable covering may include plastics and other material such as concrete. The panel of this invention especially contemplates foamed polyurethane which is placed in a closed mold. However, the flowable and hardenable covering material may also be foamable polystyrene or expandable polystyrene bead, or foamable polybutadiene. Panels employing any of these plastic materials would be prepared in a closed mold. On the other hand, concrete and foamed concrete panels claimed in this invention may be prepared in an open mold, i.e. a mold having no top; because no pressure is created by the concrete during its setting and hardening period. Concrete and foamed concrete would usually be prepared away from the mold and then placed in the mold, whereas foaming plastics must, of necessity, complete their foaming reactions in situ within a mold.

The panel member according to this invention contemplates a substantially seamless covering over the first and second major faces of the panel, and over at least a portion of the outer periphery of the core between those major faces. In order that the covering be substantially seamless, it is necessary to make the panel in a mold with the core usually being placed therein before any of the covering material, and being spaced away from the major faces of the mold.

The embodiments of the invention in which an exclusive property or privilege is claimed are defined as follows:

1. A molded panel consisting essentially of a core and a substantially seamless covering of flowable and hardenable urethane based plastic foam material which is substantially rigid when hardened over said core; where said core has spaced apart first and second major faces with a sheet-like covering over said core defining said faces and a plurality of walls extending between said sheet-like coverings, said plurality of walls and said sheet-like coverings at said first and second major faces forming a plurality of cells extending between said major faces and bounded by said walls; the flowable and hardenable urethane based plastic foam material covering over said core being substantially seamless over said first and second major faces and over at least a portion of the outer periphery of said core between said major faces.

2. The panel of claim 1 where said covering extends substantially seamlessly over said first and second major faces and over the entire periphery of said core between said major faces.

3. The panel of claim 1 where the material of said covering extends into at least one of said plurality of cells formed between said major faces.

4. A panel according to claim 2 where said core is of honeycomb structure and said first and second major faces are substantially parallel.

* * * * *